J. R. LACKLAND.
AUTOMATIC ANGLE INDICATOR.
APPLICATION FILED MAY 6, 1919.
1,346,547.
Patented July 13, 1920.
2 SHEETS—SHEET 1.
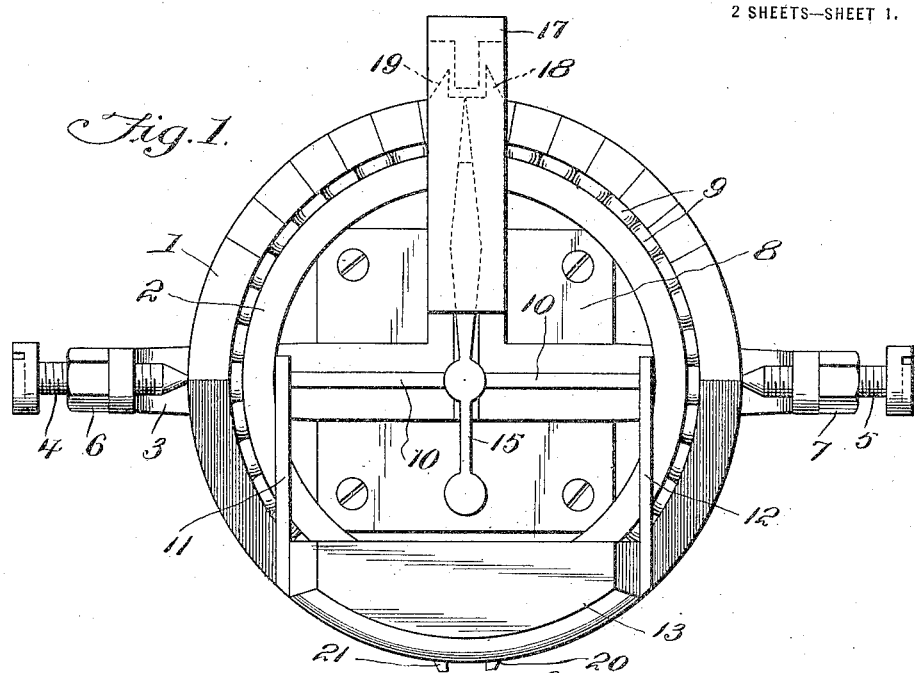
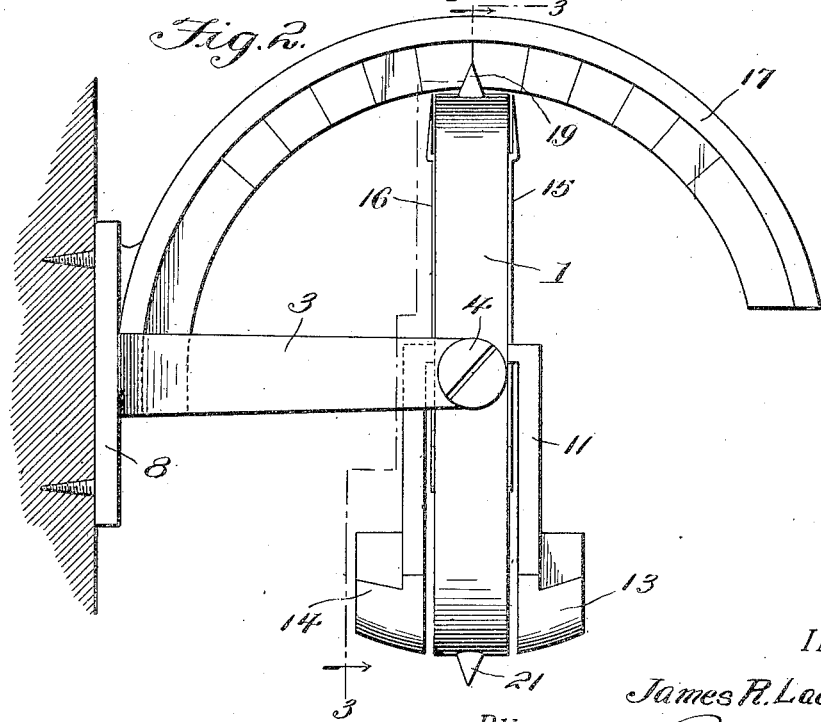
INVENTOR
James R. Lackland
BY
Robert H. Young
Attorney J. R. LACKLAND.
AUTOMATIC ANGLE INDICATOR.
APPLICATION FILED MAY 6, 1919.
1,346,547.
Patented July 13, 1920.
2 SHEETS—SHEET 2.
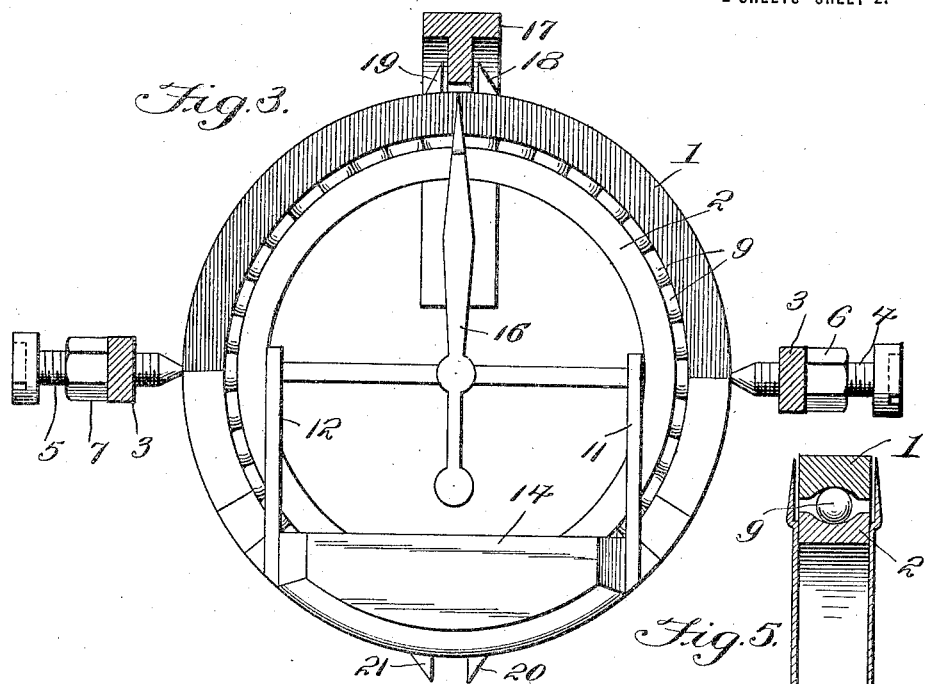
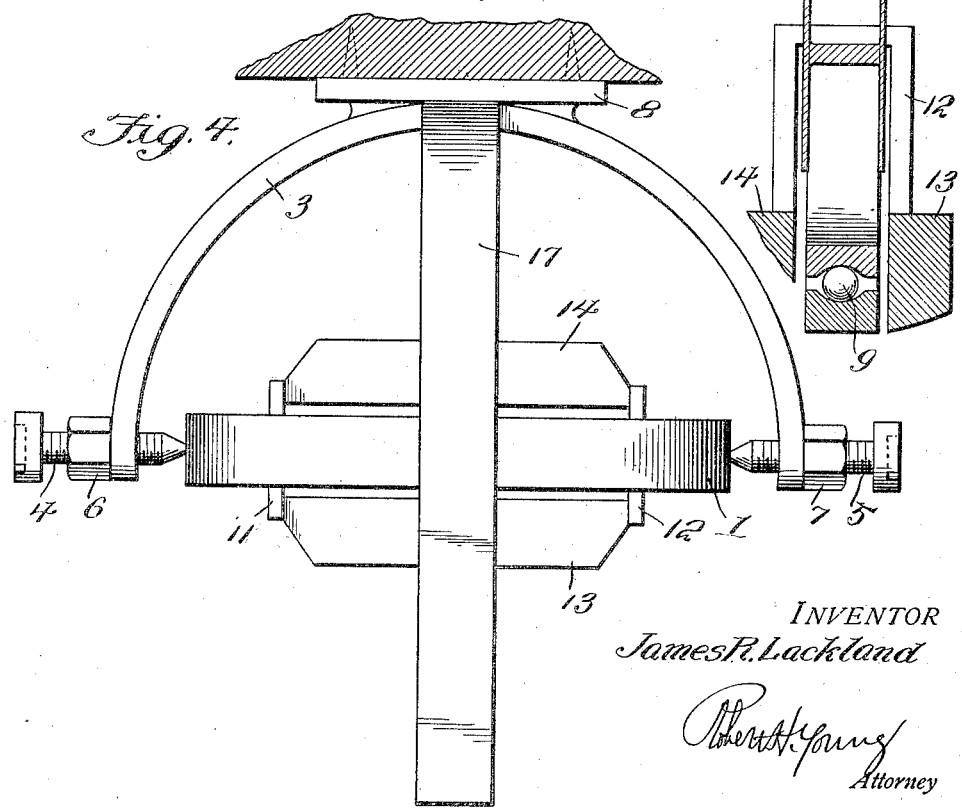
INVENTOR
James R. Lackland
Attorney

UNITED STATES PATENT OFFICE.

JAMES REGINALD LACKLAND, OF CRESTON, IOWA.

AUTOMATIC ANGLE-INDICATOR.

1,346,547.          Specification of Letters Patent.      Patented July 13, 1920.

Application filed May 6, 1919. Serial No. 295,141.

*To all whom it may concern:*

Be it known that I, JAMES REGINALD LACKLAND, a citizen of the United States, residing at Creston, in the county of Union and State of Iowa, have invented certain new and useful Improvements in Automatic Angle-Indicators, of which the following is a specification.

The present invention relates to automatic angle indicators and is directed particularly to the provision of a device for use on aeroplanes to indicate the degree of lateral inclination and the diving or climbing angle thereof.

The device is characterized by the use of a ball-bearing supported by two fixed pivots rigidly attached to the aeroplane. The inner ring of this bearing is movable and carries pointers and a counterweight which maintains it constantly vertical. The pointers are located in front of scales on the external ring with which they coöperate to indicate the degree of lateral inclination. A graduated sector, rigidly attached to the aeroplane and located in a plane perpendicular to that of the ball-bearing, coöperates with pointers on the ball-bearing to indicate by the movements of the bearing, the degree of inclination in climbing or in diving.

Further objects of the invention will appear from consideration of the following description taken in conjunction with the drawings, which latter illustrate an embodiment of the invention, like numerals therein indicating the same parts throughout the several views, of which:—

Figure 1 represents a front elevation of the device,

Fig. 2, a side elevation,

Fig. 3, a vertical section taken on line 3—3 of Fig. 2,

Fig. 4, a plan view,

Fig. 5, a vertical section taken through the center of the swinging portion of the device, showing the relation of the several parts thereof.

The device consists essentially of a ball-bearing provided with two rings 1 and 2, pivoted in the extension of its horizontal diameter on a semi-circular support 3 by means of screws 4 and 5 provided with lock nuts 6 and 7, respectively. The support 3 is provided at its center with a connecting plate 8 which is adapted to be secured to the instrument board of the aeroplane. In order to facilitate the rotary movements of ring 2 which is located concentrically within ring 1, there are provided a number of balls 9 in the space which separates the two rings, the balls being retained in place by means of corresponding peripheral grooves on the inner and outer faces of ring 1 and ring 2, respectively. Ring 2 is provided with a horizontal diametral bar 10 carrying at its ends two stirrups 11 and 12. The lower ends of these stirrups on one side of the ball-bearing are attached to a weight 13, while those on the other side are attached to a weight 14. It will thus be seen that these two weights 13 and 14 serve to ballast the assemblage of the ball-bearing, and tend to hold it in the vertical position. Ring 1 of the bearing is provided on the upper half of the front face thereof with a scale, the graduations of which are so arranged that the zero indication comes at the topmost point of the ring, as shown in Fig. 1. The lower half of the same face of ring 1 is marked in red, or with some other distinguishing marking (as shown by hatched lines in Fig. 1), while on the rear face of ring 1, the scale is located on the lower half of the ring with the zero indication at the lowermost point thereof and the portion marked in red on the upper half of the ring. The purpose of this will appear later. Bar 10 is provided at its center with two pointers 15 and 16, rigidly attached at right angles thereto and the ends of which may move freely about the periphery of ring 1.

Above the ball-bearing, there is arranged a sector 17 provided with graduations on each side thereof and attached at its rear extremity to plate 8 transversely of the ball-bearing. The two scales on member 17 have their zero points at the topmost point thereof, with the scale graduations running down on either side. Ring 1 is provided on its periphery at the top thereof with pointers 18 and 19, and at the bottom with pointers 20 and 21, adapted to coöperate with the scales on sector 17 to indicate the angular relation of the ball-bearing thereto.

The device being attached to the instrument board of the aeroplane in the manner indicated in Fig. 2, the slightest inclination of the aeroplane, either to the left or to the right, or from the front to the rear, or from the rear to the front, will be immediately indicated in the former case by the movement of pointer 15 in front of the scale on the upper half of the front face of ring 1, and by that of pointers 18 and 19 in front of the scale on each side of member 17 in the case of the latter, and the degrees corresponding to these movements easily read off.

When pointers 15 and 18, 19 are at zero on ring 1 and sector 17, respectively, the aviator is certain that his plane is flying with perfectly horizontal keel.

Should the aeroplane be reversed, i. e., fly upside down, the appearance of the portions of ring 1, which are marked in red, behind either pointer 15 or pointer 16, will indicate the reversal to the aviator and be a warning to him that he is in danger.

While the details of construction have been described more or less precisely, it is not intended that the scope of the invention be limited thereto, as changes in form, the proportion of parts, and the substitution of equivalents as circumstances may suggest or render expedient, may be made without departing from the spirit of the invention.

What I claim is:

1. An automatic angle indicator comprising in combination, a ball-bearing, means for supporting said bearing at its horizontal axis for pivotal movement about one of the diameters, a weight eccentrically located on the inner ring of said ball-bearing, whereby to maintain the bearing in a vertical position, pointer means rigidly attached to the inner ring of said ball-bearing, the outer ring of the bearing having graduations with which said pointer means are adapted to coöperate, a graduated sector rigidly attached to said supporting means and lying in a plane perpendicular to that of said ball-bearing, and pointer means on the outer ring of said bearing adapted to coöperate with the graduations on said sector.

2. In an automatic angle indicator, the combination of a ball-bearing, provided with a ring having an eccentrically located weight and with pointer means and a second ring provided with graduations for coöperation with said pointer means, means for pivotally supporting said second ring to turn about one of its diameters, additional pointer means located on said last named ring, and means located in a plane perpendicular to that of the ball-bearing and provided with graduations with which said additional pointer means are adapted to coöperate.

3. In an automatic angle indicator, the combination of a ball-bearing, provided with a ring graduated on one half of one face thereof and provided with a distinguishing marking on the other face thereof, a distinguishing marking on the other half of the first mentioned face of said ring and graduations on the other face of that half of the ring, a second ring having an eccentrically located weight and pointer means forming part of said ball-bearing, said pointer means being adapted to coöperate with the graduations and markings on said first mentioned ring, and means for attaching said bearing to the object the inclination of which is to be indicated.

In testimony whereof I have affixed my signature.

JAMES REGINALD LACKLAND.